United States Patent [19]

Tada et al.

[11] Patent Number: 5,318,829

[45] Date of Patent: Jun. 7, 1994

[54] HEAT SHRINKABLE LAMINATE FILM

[75] Inventors: Teruo Tada, Marugame; Hideyuki Yamashita, Sakaide; Kazuo Kondo, Marugame, all of Japan

[73] Assignee: Okura Industrial Co., Ltd., Japan

[21] Appl. No.: 14,558

[22] Filed: Feb. 8, 1993

[30] Foreign Application Priority Data

Mar. 13, 1992 [JP] Japan ................... 4-089377

[51] Int. Cl.$^5$ ............................................. B32B 7/02
[52] U.S. Cl. ............................. 428/213; 428/34.9; 428/349; 428/475.8; 428/516; 428/520; 428/522; 428/913
[58] Field of Search ............... 428/349, 516, 34.9, 428/213, 520, 522, 475.8, 913

[56] References Cited

U.S. PATENT DOCUMENTS

| | | | |
|---|---|---|---|
| 4,501,797 | 2/1985 | Super et al. | 428/349 |
| 4,610,914 | 9/1986 | Newsome | 428/34.9 |
| 4,695,491 | 9/1987 | Kondo et al. | 428/34.9 |
| 4,726,984 | 2/1988 | Shah | 428/349 |

FOREIGN PATENT DOCUMENTS 0236099 2/1987 European Pat. Off. .
3243462 11/1982 Fed. Rep. of Germany .

*Primary Examiner*—Edith Buffalow
*Attorney, Agent, or Firm*—Lorusso & Loud

[57] ABSTRACT

A heat shrinkable laminate film is disclosed which includes a core layer formed of an ethylene-vinyl alcohol copolymer, two intermediate layers provided on opposite surfaces of the core layer and each formed of a copolymer selected from (a) copolymers of an unsaturated carboxylic acid or a derivative thereof and propylene and (b) copolymers of an unsaturated carboxylic acid or a derivative thereof and an alpha-olefin-propylene copolymer containing not greater than 10% by weight of alpha-olefin comonomer, and two outer layers provided on respective surfaces of the intermediate layers and each formed of an ethylene polymer.

7 Claims, 1 Drawing Sheet

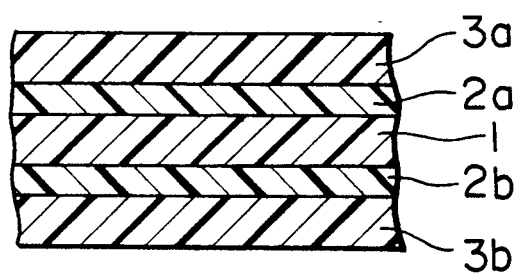

HEAT SHRINKABLE LAMINATE FILM

This invention relates to a laminate film and, more specifically, to a heat shrinkable, laminated film having excellent gas barrier properties.

Packaging process wherein an article is enclosed with a packaging film using a pillow packing machine and the resulting enclosure is thermally shrunk within a heating tunnel is now likely used in various fields. As such heat shrinkable films, polyethylene films, polypropylene films and poly(vinyl chloride) films have thus far been used for reasons of good compatibility to high speed packing machines and freedom of generating harmful gases upon being combusted. Because of their poor oxygen barrier properties, however, these films are ill-suited for packaging foods and fragrant materials.

To cope with this problem, laminate films having an ethylene-vinyl alcohol copolymer layer having good gas barrier properties have been proposed.

U.S. Pat. No. A-4,726,984 discloses a five-layer film composed of a core layer of an ethylene-vinyl alcohol copolymer, two outer layers of a blend of polypropylene and ethylene-propylene copolymer, and two intermediate adhesive layers disposed between the core layer and the respective outer layers. While this film permits high speed, automatic package, the heat sealability and gas barrier properties thereof are not satisfactory. In particular, this film requires a specific narrow range of temperature to perform heat sealing and does not provide a high seal strength. Further, when this film is subjected to repeated bending, pin holes are formed to the extent that the gas barrier properties thereof are damaged.

U.S. Pat. No. A-4,547,433 discloses a five-layer film composed of a core layer of an ethylene-vinyl alcohol copolymer, two outer layers one of which is formed of an ethylene-alpha-olefin copolymer and/or an ethylene-vinyl acetate copolymer and the other one of which is formed of a cross-linked product of the above copolymer, and two intermediate, adhesive layers disposed between the core layer and the respective outer layers. While this film has good gas barrier properties, the toughness is not satisfactory so that breakage or elongation is apt to occur during packaging operations. Further, cross-linking of the outer layer is essential in order to smoothly perform stretching. Cross-linking is, however, undesirable because heat-sealability is adversely affected and because the cross-linked film cannot be melted and, therefore, cannot be reused.

The present invention has been made with the foregoing problems of the conventional laminate films in view. In accordance with the present invention there is provided a heat-shrinkable laminate film comprising:

a core layer comprising an ethylene-vinyl alcohol copolymer;

two intermediate layers provided on opposite surfaces of said core layer and each comprising a propylene copolymer selected from the group consisting of (a) copolymers of an unsaturated carboxylic acid or a derivative thereof and propylene and (b) copolymers of an unsaturated carboxylic acid or a derivative thereof and an alpha-olefin-propylene copolymer containing not greater than 10% by weight of alpha-olefin comonomer; and two outer layers provided on respective surfaces of said intermediate layers and each comprising an ethylene polymer.

An unoriented laminate film from which the heat-shrinkable laminate film according to the present invention is to be produced does not require any cross-linking treatment. Nonetheless, the unoriented film may be easily stretched to provide the heat-shrinkable laminate film having excellent heat shrinkability. Moreover, the laminate film thus obtained exhibits good heat sealability and gas barrier properties and has sufficient toughness and, thus, is suited for use in high speed automatic packaging.

The present invention will now be described in detailed below with reference to the accompanying drawing, in which the sole FIGURE is a sectional view schematically illustrating a laminate film according to the present invention.

Referring to the FIGURE, designated as 1 is a core, gas-barrier layer formed of an ethylene-vinyl alcohol copolymer. The ethylene-vinyl alcohol copolymer is preferably one which is obtained by saponifying an ethylene-vinyl acetate copolymer having an ethylene comonomer content of 25–50 mole % with a saponification degree of 95% or more. If desired, the core layer 1 may also contain a resin compatible with the ethylene-vinyl alcohol copolymer, such as a polyamide or an ethylene-vinyl acetate copolymer, in such an amount that the gas barrier properties thereof are not adversely affected. The thickness of the core layer 1 is preferably 1–10 $\mu$m, more preferably 2–6 $\mu$m, for reasons of optimum gas barrier properties.

Provided on both sides of the core layer 1 are intermediate, adhesive layers 2a and 2b. Each of intermediate layers, 2a and 2b includes a propylene copolymer which contains propylene as major monomer units and which is selected from (a) copolymers of an unsaturated carboxylic acid or a derivative thereof and propylene and (b) copolymers of an unsaturated carboxylic acid or a derivative thereof and an alpha-olefin-propylene copolymer containing not greater than 10 by weight of alpha-olefin comonomer.

The propylene copolymer is preferably a graft copolymer obtained by grafting the unsaturated carboxylic acid or derivative thereof on polypropylene homopolymers or alpha-olefin-propylene copolymers. The alpha-olefin may be, for example, ethylene or 1-butene. The amount of the alpha-olefin in the alpha-olefin-propylene copolymer should be 10% by weight or less since otherwise the unoriented laminate film is unable to be uniformly stretched and, further, the stretched laminate film becomes ill-suited for high speed automatic packaging.

The derivatives of the unsaturated carboxylic acid include, for example, an anhydride, an ester and an amide. Illustrative of suitable unsaturated acids and derivatives thereof are acrylic acid, methacrylic acid, maleic acid, fumaric acid, itaconic acid, acrylic anhydride, methacrylic anhydride, maleic anhydride, itaconic anhydride, methyl acrylate, methyl methacrylate, ethyl acrylate, ethyl methacrylate, monomethyl ester of maleic acid, monoethyl ester of maleic acid, acrylamide and methacrylamide. The content of the unsaturated carboxylic acid or derivative thereof in the propylene copolymer is preferably 0.1–2% by weight.

The total thickness of the intermediate layers 2a and 2b is preferably 10–60%, more preferably 20–50% of the total thickness of the heat-shrinkable laminate film for reasons of good stretchability, toughness and shrinkability. When the total thickness of the intermediate layers 2a and 2b is below 10%, it becomes difficult to stretch the unoriented raw film in a stable manner. Further, the stretched film fails to exhibit significantly improved toughness and heat shrinking speed. On the other hand, when the total thickness of the intermediate layers 2a and 2b exceeds 60%, pin holes tend to be formed during use of the heat-shrinkable laminate film so that the gas barrier properties thereofare deteriorated. Further, the laminate film fails to exhibit significantly improved heat seal strength.

The respective surfaces of said intermediate layers 2a and 2b opposite the core layer 1 are provided with outer layers 3a and 3b each including an ethylene polymer. The ethylene polymer is a polymer containing ethylene as major component and may be a polyethylene homopolymer or a copolymer of ethylene such as an ethylene-alpha-olefin copolymer, an ethylene-vinyl acetate copolymer or an ethylene-ethyl acrylate copolymer. The use of a straight chain copolymer which is composed of ethylene and an alpha-olefin having 4–8 carbon atoms and which has a specific gravity of 0.900–0.930 is particularly preferred. If desired, the outer layers 3a and 3b may contain one or more additives such as antistatic agent, a lubricant, a heat stabilizer and a moisture deposition-preventing agent.

The heat-shrinkable laminate film according to the present invention may be prepared in any conventionally known method. For example, using three extruders and a five layered die, an ethylene-vinyl alcohol copolymer, a propylene copolymer and an ethylene polymer are coextruded to obtain an extruded five-layer film. The extruded film is rapidly cooled and is then stretched. When the stretching is performed by an inflation method, the above coextrusion is performed using a circular die to obtain a tubular extruded film. The stretching is performed at an elevated temperature uniaxially or biaxially using a tenter stretching device in the case of sheet-like film or an inflation stretching device in the case of a tubular film. Biaxial stretching is preferred when the laminate film is used for packaging articles by heat-shrink packaging. The stretching ratio is generally 2.5–5.0 in each of the longitudinal and transverse directions. The unoriented laminate film which uses a propylene copolymer for forming the intermediate adhesive layers shows good processability in stretching.

The resulting stretched, heat-shrinkable laminate film generally has a thickness of 10–50 μm. The laminate film has high toughness and high heat-shrinking speed so that it is very suited for high speed, automatic heat-shrink packaging. Further, the use of a non-crosslinked ethylene polymer as the outer layers gives improved heat-sealability and resistance to pin-holes formation. When an ethylene copolymer is substituted for the propylene copolymer, the resulting laminate film becomes poor in toughness and slow in heat-shrinking speed though an improved inter-layer adhesion strength is obtainable.

The following examples will further illustrate the present invention. The number of pin holes, the temperature range suitable for heat sealing and the strength of heat seal are measured in the following manner:

Number of Pin Holes

Sample film (200 mm×280 mm) is shaped into a cylindrical form. One end of the cylindrical film is fixed to a twist-reciprocating member of a testing machine with the other end thereof being fixed to a stator. The twist-reciprocating member is adapted to reciprocate between first and second positions and rotate through 360° during its movement toward the stator (from the first position to the second position) and rotate in a reverse direction during its movement in the direction apart from the stator (from the second position to the first position). The machine is then operated to perform 2,000 reciprocations. The number of pin holes formed as a result of the test is counted.

Temperature Range Suitable for Perform Heat-Sealing

Using a pillow packaging machine, a box is packaged with sample film while sealing with a hot seal plate at various sealing temperatures of $(100+10n)°$ C., wherein n is an integer of 0 or more. The temperature range which can provide a seal strength of 200 g/cm or more is measured.

Strength of Heat Seal

Using a pillow packaging machine, sample film is sealed at a temperature which can provide optimum seal strength. The sealed film is cut into a tape having a width of 1 cm such that the sealed portion is oriented transversely. The tape is attached to a tensile testing machine and drawn at a rate of 300 mm/min until the tape is broken at the sealed portion. The maximum strength required to break the seal portion is measured.

EXAMPLE 1

Three extruders were connected through a distributor to a circular, five-layered coextrusion die to prepare a tubular, five layer laminate film. Thus, three kinds of copolymers, i.e. (A) ethylene-vinyl alcohol copolymer (ethylene content: 32 mole %, saponification degree: over 99%), (B) maleic anhydride-grafted propylene-ethylene copolymer (ethylene content: 2% by weight) and (C) low density polyethylene (ethylene-hexene copolymer having a hexene content of 6 mole %), were fed through respective extruders to the circular die to form the five layer extruded film of a C/B/A/B/C structure in which copolymer (A) formed a core layer, copolymer (B) formed two intermediate, adhesive layers and copolymer (C) formed two outer layers. The tubular extruded film was rapidly cooled to room temperature and then subjected to inflation biaxial stretching at a stretching temperature of 120° C., stretching ratios of 3.5 in the longitudinal (machine) direction and 3.5 in transverse direction, and longitudinally cut to obtain a thermally shrinkable laminate film having thicknesses of C/B/A/B/C layers of 10/4/2/4/10 (μm), respectively. The total thickness of the intermediate layers B was thus about 27% (8/30×100%) of the total thickness of the laminate film. The stretching was able to be continuously carried out in a stable manner for a long period of time.

Foamed trays (120 mm×210 mm×20 mm) were continuously packed with the thus obtained laminate film at a rate of 50 trays per minute using a pillow packaging machine. The packages were continuously passed through a heater tunnel with a residence time of 4 seconds to effect heat shrinkage. No troubles were caused during packing with the pillow packaging machine. The film was found to be completely shrunk during the passage through the tunnel.

The laminate film was further tested to reveal that the number of pin holes was zero, the temperature range suitable for heat sealing was between 130° and 200° C., the strength of heat seal was 600 g/cm and the Young's modulus was 6,000 kg/cm$^2$.

COMPARATIVE EXAMPLE 1

Example 1 was repeated in the same manner as described except that the maleic anhydride-grafted propylene-ethylene copolymer (ethylene content: 2% by weight) was replaced by a maleic anhydride-grafted polyethylene for forming each of the intermediate layers. It was found that the stretching was not able to be continuously performed for a long period of time. In the continuous automatic packaging, the film was tend to be caught by the former of the pillow packaging machine to cause breakage of the film. Further, the heat shrinkage was not completed within the 4 seconds heat treatment so that slack packages resulted. The Young's modulus of the film was 3,000 kg/cm$^2$.

COMPARATIVE EXAMPLE 2

Example 1 was repeated in the same manner as described except that the low density polyethylene (ethylene-hexene copolymer having a hexene content of 6 mole %) was replaced by an ethylene-propylene copolymer having an ethylene content of 3 % by weight for forming each of the outer layers. The stretching was able to be continuously carried out in a stable manner for a long period of time. No troubles were caused during packing with the pillow packaging machine. The film was found to be completely shrunk during the passage through the tunnel. However, the film was found to have problems in resistance to pin hole formation and heat seal strength. Namely, the tests revealed that the number of pin holes was 5, the temperature range suitable for heat sealing was between 150° and 200° C., the strength of heat seal was 300 g/cm and the Young's modulus was 11,000 kg/cm$^2$.

COMPARATIVE EXAMPLE 3

Example 1 was repeated in the same manner as described except that the maleic anhydride-grafted propylene-ethylene copolymer (ethylene content: 2% by weight) was replaced by a maleic anhydride-grafted propylene-butylene copolymer (butylene content: 15% by weight) for forming each of the intermediate layers. It was found that the stretching was not able to be continuously performed for a long period of time. The Young's modulus of the film was 4,000 kg/cm$^2$.

EXAMPLE 2

Example 1 was repeated in the same manner as described except that the thicknesses of the layers of the C/B/A/B/C film were changed to 12/2/2/2/12. The total thickness of the intermediate layers B was thus about 13% (4/30×100%). The stretching was able to performed continuously for a long period of time but in a less stable manner in comparison with that in Example 1. The film permitted high speed automatic shrink packaging without no substantial troubles. The appearance of the packages was inferior to that in Example 1, however. Tests revealed that the temperature range suitable for heat sealing was between 130° and 200° C., the strength of heat seal was 650 g/cm and the Young's modulus was 4,000 kg/cm$^2$.

EXAMPLE 3

Example 1 was repeated in the same manner as described except that the thicknesses of the layers of the C/B/A/B/C film were changed to 6/8/2/8/6. The total thickness of the intermediate layers B was thus about 53% (16/30×100%). The stretching was able to performed continuously for a long period of time likewise in Example 1. The film permitted high speed automatic shrink packaging without no troubles. The appearance of the packages was comparable to that in Example 1. Tests revealed that the temperature range suitable for heat sealing was between 130° and 200° C., the strength of heat seal was 400 g/cm and the Young's modulus was 9,000 kg/cm$^2$. Thus, the heat seal strength was much inferior in comparison with that in Example 1.

What is claimed is:

1. A heat shrinkable laminate film comprising:
   a core layer comprising an ethylene-vinyl alcohol copolymer
   two intermediate layers provided on opposite surfaces of said core layer and each comprising a propylene copolymer containing propylene as its major monomer unit and which is selected from the group consisting of (a) copolymers of an unsaturated carboxylic acid or a derivative thereof and propylene and (b) copolymers of an unsaturated carboxylic acid or a derivative thereof and an alpha-olefin-propylene copolymer containing not greater than 10% by weight of alpha-olefin comonomer; and
   two outer layers provided on respective surfaces of said intermediate layers and each consisting essentially of a non-crosslinked ethylene polymer having an ethylene content of at least 50% and selected from the group consisting of ethylene-alpha-olefin copolymers, ethylene-vinyl acetate copolymers and ethylene-ethyl acrylate copolymers wherein said ethylene-alpha-olefin copolymers are straight chain copolymers of ethylene and an alpha-olefin having 4-8 carbon atoms, said straight chain copolymer having a specific gravity of 0.900–0.930.

2. A laminate film as set forth in claim 1, wherein the total thickness of said two intermediate layers is 10–60% of the total thickness of said laminate film.

3. A laminate film as set forth in claim 1, wherein said unsaturated carboxylic acid derivative is selected from the group consisting of anhydrides, esters and amides.

4. A laminate film as set forth in claim 1, wherein said copolymers (a) are polypropylenes having said unsaturated carboxylic acid or derivative thereof grafted thereon.

5. A laminate film as set forth in claim 1, wherein said copolymers (b) are alpha-olefin-propylene copolymers having said unsaturated carboxylic acid or derivative thereof grafted thereon.

6. A laminate film as set forth in claim 1 wherein said copolymer of said two intermediate layers is a polypropylene having said unsaturated carboxylic acid or derivative thereof grafted thereon.

7. A laminate film as set forth in claim 1, wherein said copolymer of said two intermediate layers is an alpha-olefin-propylene copolymer having said unsaturated carboxylic acid or derivative thereof grafted thereon.

* * * * *